United States Patent
Lin et al.

(10) Patent No.: US 10,868,797 B1
(45) Date of Patent: Dec. 15, 2020

(54) SYSTEM AND METHOD OF TRANSLATING NETWORK ADDRESS

(71) Applicant: HONGFUJIN PRECISION ELECTRONICS(TIANJIN)CO., LTD., Tianjin (CN)

(72) Inventors: Chun-Hung Lin, New Taipei (TW); Jiing-Shyang Jang, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/512,773

(22) Filed: Jul. 16, 2019

(30) Foreign Application Priority Data

May 22, 2019 (CN) .......................... 2019 1 0431481

(51) Int. Cl.
*H04L 29/12* (2006.01)

(52) U.S. Cl.
CPC ...... *H04L 61/2517* (2013.01); *H04L 29/1233* (2013.01); *H04L 29/12339* (2013.01); *H04L 61/2514* (2013.01); *H04L 61/2592* (2013.01)

(58) Field of Classification Search
CPC .......... H04L 29/12339; H04L 29/1233; H04L 29/06142; H04L 69/167
See application file for complete search history.

(56) References Cited

U.S. PATENT DOCUMENTS

| | | | | |
|---|---|---|---|---|
| 5,636,216 A | * | 6/1997 | Fox | H04L 12/66 370/402 |
| 6,243,379 B1 | * | 6/2001 | Veerina | H04L 12/46 370/389 |
| 6,886,027 B2 | * | 4/2005 | Tajiri | H04L 29/06027 370/351 |
| 10,659,569 B1 | * | 5/2020 | Tourrilhes | H04L 69/14 |
| 2003/0106067 A1 | * | 6/2003 | Hoskins | H04L 12/2801 725/119 |
| 2004/0143643 A1 | * | 7/2004 | Takamoto | H04L 67/2842 709/215 |
| 2007/0061465 A1 | * | 3/2007 | Kim | H04L 29/12301 709/226 |
| 2007/0071027 A1 | * | 3/2007 | Ogawa | H04L 61/2535 370/465 |
| 2013/0294461 A1 | * | 11/2013 | Zhou | H04L 61/2514 370/475 |
| 2017/0264695 A1 | * | 9/2017 | Markovitz | H04L 67/16 |
| 2018/0234535 A1 | * | 8/2018 | Chang | H04L 12/66 |
| 2020/0112562 A1 | * | 4/2020 | Hearty | G06F 17/18 |

\* cited by examiner

*Primary Examiner* — Raj Jain
(74) *Attorney, Agent, or Firm* — ScienBiziP, P.C.

(57) ABSTRACT

A method of translating network addresses includes defining a service address including a first IP address for a server. The server actually uses a service address including a second IP address. A packet originating from a client is received, the target address of the packet being the first IP address. The destination address of the packet is changed from the first IP address to a third IP address. The destination address of the packet is then changed from the third IP address to the second IP address. The first packet is then sent to the server. The present disclosure also provides a system for implementing the method of translating network address. The security of data transmission is improved while resolving IP network segment conflicts.

12 Claims, 2 Drawing Sheets

SYSTEM AND METHOD OF TRANSLATING NETWORK ADDRESS

CROSS-REFERENCE TO RELATED APPLICATIONS

This application claims priority to Chinese Patent Application No. 201910431481.4 filed on May 22, 2019, the contents of which are incorporated by reference herein.

FIELD

The subject matter herein generally relates to a system and a method of translating network address.

BACKGROUND

In an environment where private clouds are deployed to enterprise customers, issues of connecting the public network to the client network in the private clouds may raise concerns because of security, convenience, and deployment efficiency.

For example, in RFC 1918, the addresses of the network segments 10.0.0.0-10.255.255.255, 172.16.0.0-172.31.255.255, and 192.168.0.0-192.168.255.255 are defined as private IP addresses, which are suitable for use in LANs to avoid conflicts with network IPs. Therefore, the private network segment that the cloud service uses may be the same as the private network segment of the client or may conflict with a used IP. When a conflict occurs, it is necessary to coordinate with the client and arrange a workaround, which can involve considerable risk and time consumption. Additionally, for security considerations, when cloud services are connected to the client network, security scans and corrections are often required. Servers that provide cloud services may also risk being exposed to external networks.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
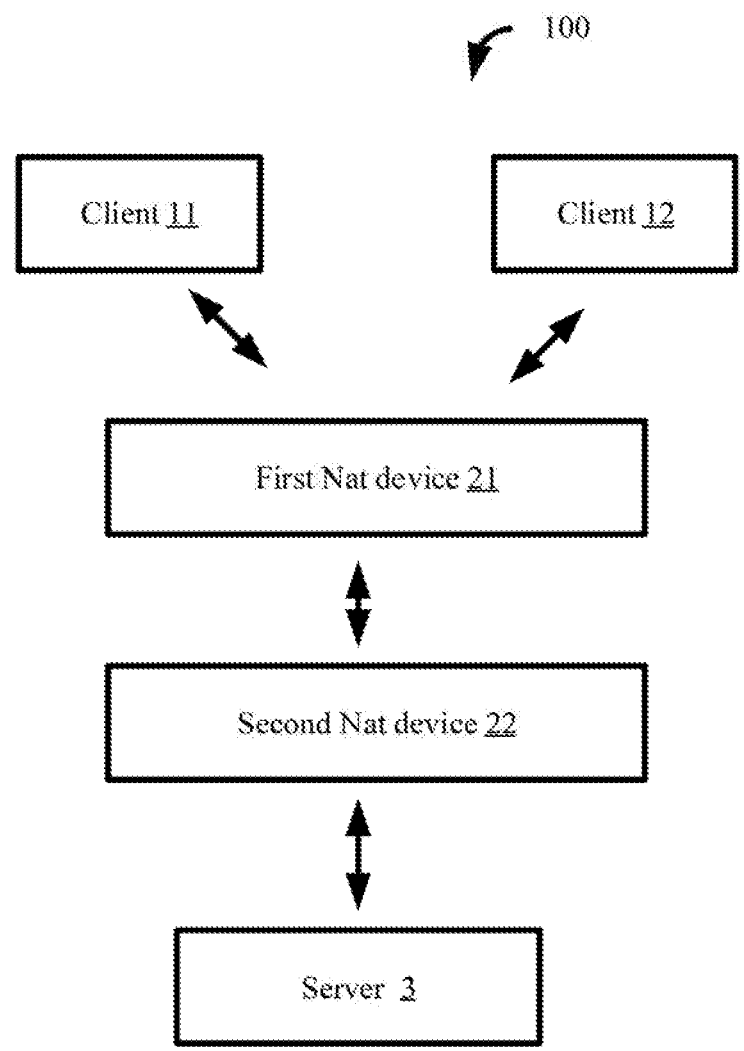
FIG. 1 illustrates a block diagram of a network address translating system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a block diagram of a network address translating system.

In the embodiment, a network address translating system 100 includes one or more clients (e.g., client 11 and client 12), a first Network Address Translation device (NAT) 21, a second Nat device 22, and a server 3.

In the embodiment, the server 3 can provide cloud services such as cloud storage to the clients.

In at least one embodiment, a private IP address of at least one of the one or more clients is the same as a private IP network segment of the server 3.

In at least one embodiment, the first Nat device 21 and the second Nat device 22 can be any terminal servers or virtual machines capable of performing network address translation. In at least one embodiment, the first Nat device 21 and the second Nat device 22 can be connected through a bridge or a virtual switch.

In at least one embodiment, the server 3 and the one or more clients are in different private networks.

Figure 2:
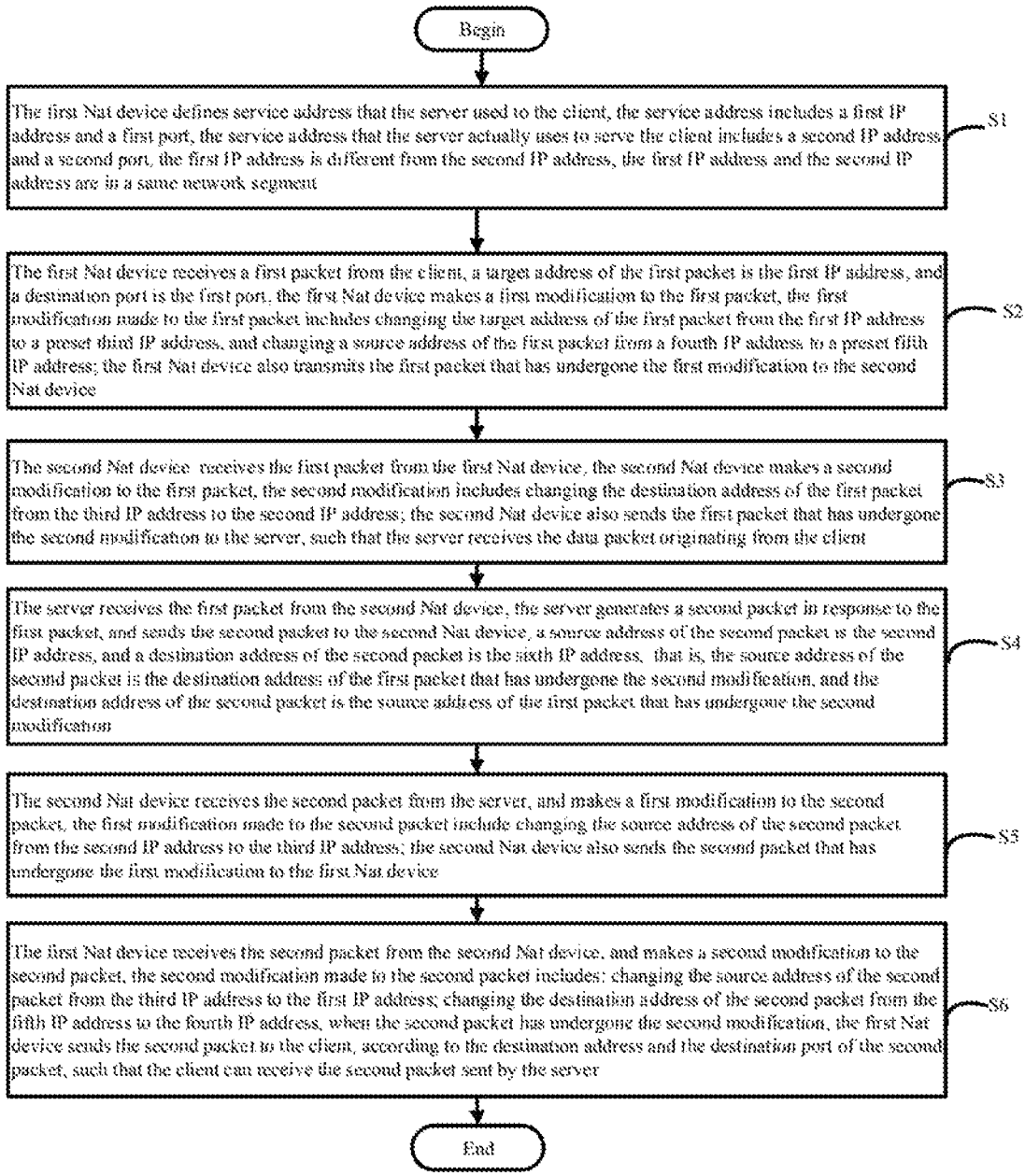
FIG. 2 illustrates an embodiment of a method of translating network addresses during a transmission of a data packet.

Referring to FIG. 2, the method is provided by way of example, as there are a variety of ways to carry out the method. The method described below can be carried out using the configurations illustrated in FIG. 1, for example, and various elements of these figures are referenced in explanation of method. Each block shown in FIG. 2 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S301.

At block S1, the first Nat device 21 defines a service address that the server 3 uses to serve the client (e.g., the client 11, and/or client 12). The service address includes a first IP address and a first port. The service address that the server 3 actually uses to serve the client includes a second IP address and a second port. In at least one embodiment, the first IP address is different from the second IP address, the first IP address and the second IP address are in a same network segment.

In other words, the first IP address is not an IP address actually used by the server 3. The IP address actually used by the server 3 is the second IP address.

In at least one embodiment, the first port can be a port actually used when the server 3 serves the client (e.g., the client 11, and/or client 12). In other words, the first port and the second port may be the same or different.

In at least one exemplary embodiment, the server 3 serves the client (e.g., the client 11, and/or client 12) can refer to provide cloud storage service to the client. In other words, the server 3 can be a cloud server, and the client can store data in the server 3.

For example, it is assumed that the IP address of the client 11 is 192.168.88.200/24, and the IP address of the client 12 is 192.168.88.105/24. The first Nat device 21 defines the first IP address as 192.168.88.101/24, and defines the first port as 80. The second IP address is 192.168.88.105/24, and the second port is 90. In this example, the IP network segment of the server 3 and the client 12 collide.

It should be noted that the above exemplary IP addresses and exemplary ports are merely illustrative and should not be construed as limit to the present disclosure.

At block S2, the first Nat device 21 receives a first packet from the client (for example, from the client 11 or the client 12), i.e., the first packet originates from the client. A target address of the first packet is the first IP address, and a destination port is the first port. That is, the first packet is a data packet that the client needs to send to the server 3.

In this embodiment, when the first packet originating from the client is received by the first Nat device 21, the first Nat device 21 makes a first modification to the first packet. In at least one exemplary embodiment, the first modification made to the first packet can include, but is not limited to, changing the target address of the first packet from the first IP address to a preset third IP address, and changing a source address of the first packet from a fourth IP address to a preset fifth IP address.

For a clearer illustration of the present disclosure, the fourth IP address is the IP address of the client that sends the first packet, and the port of the client that sends the first packet is a fourth port. Thus, the source address of the first packet is the fourth IP address, and the source port is the fourth port.

In this embodiment, the third IP address is a preset IP address, the third IP address is different from the first IP address, and the third IP address is different from the second IP address.

In this embodiment, the third IP address and the first IP address belong to different network segments. The third IP address and the second IP address also belong to different network segments.

For example, the first Nat device 21 presets the third IP address to be 192.168.55.105/24. It can be seen that the third IP address 192.168.55.105/24 and the first IP address 192.168.88.101/24 belong to different network segments. The third IP address 192.168.55.105/24 and the second IP address 192.168.88.105/24 also belong to different network segments.

For example, when the first packet is sent by the client 12, then the fourth IP address is 192.168.88.105/24.

In an embodiment, the fifth IP address and the source address of the first packet (i.e., the fourth IP address) are IP addresses that belong to different network segments.

For example, the first Nat device 21 presets 192.168.55.254/24 as the fifth IP address.

When the first port is different from the second port, the destination port of the first packet originating from the client is the first port.

In addition, when the first port is different from the second port, the first modification made to the first packet further includes: changing the destination port of the first packet from the first port to a third port.

In this embodiment, the third port is different from the first port and different from the second port.

The first Nat device 21 also transmits to the second Nat device 22 the first packet that has undergone the first modification.

At block S3, the second Nat device 22 receives the first packet from the first Nat device 21. The second Nat device 22 makes a second modification to the first packet. The second modification can include, but is not limited to, changing the destination address of the first packet from the third IP address to the second IP address.

In an embodiment, the second modification further includes changing the source address of the first packet from the fifth IP address to a preset sixth IP address.

In an embodiment, the sixth IP address and the fifth IP address belong to different network segments. The sixth IP address and the fourth IP address belong to a same network segment.

For example, the second Nat device 22 presets 192.168.88.254/24 as the sixth IP address.

In one embodiment, the second modification made to the first packet further includes changing the destination port of the first packet from the third port to the second port.

The second Nat device 22 also sends the first packet that has undergone the second modification to the server 3, such that the server 3 receives the data packet (i.e., the first packet) originating from the client.

At block S4, the server 3 receives the first packet from the second Nat device 22. The server 3 generates a second packet in response to the first packet, and sends the second packet to the second Nat device 22.

In an embodiment, a source address of the second packet is the second IP address, and a destination address of the second packet is the sixth IP address. That is, the source address of the second packet is the destination address of the first packet that has undergone the second modification, and the destination address of the second packet is the source address of the first packet that has undergone the second modification.

For example, the server 3 generates a second packet in response to the first packet that has undergone the second modification. The source address of the second packet is 192.168.88.105/24, and the destination address of the second packet is 192.168.88.254/24.

In an embodiment, a source port of the second packet is the second port, and a destination port of the second packet is the fourth port.

At block S5, the second Nat device 22 receives the second packet from the server 3, and makes a first modification to the second packet. The first modification made to the second packet can include, but is not limited to, changing the source address of the second packet from the second IP address to the third IP address.

In an embodiment, the first modification made to the second packet can further include changing the destination address of the second packet from the sixth IP address to the fifth IP address.

In an embodiment, the first modification made to the second packet can further include changing the source port of the second packet from the second port to the third port.

The second Nat device 22 also sends the second packet that has undergone the first modification to the first Nat device 21.

At block S6, the first Nat device 21 receives the second packet from the second Nat device 22, and makes a second modification to the second packet. The second modification made to the second packet can include, but is not limited to, changing the source address of the second packet from the third IP address to the first IP address.

In an embodiment, the second modification made to the second packet further includes changing the destination address of the second packet from the fifth IP address to the fourth IP address.

In an embodiment, the second modification made to the second packet further includes changing the source port of the second packet from the third port to the first port.

The first port is set to be different from the second port, and the change of port during the transmission of the packet improves the security of the packet during the transmission process.

When the second packet has undergone the second modification, the first Nat device 21 sends the second packet to the client, according to the destination address (e.g., the fourth IP address) and the destination port of the second packet, such that the client receives the second packet sent by the server 3.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A method of translating network address, comprising:
   defining a service address for a server, wherein the defined service address comprises a first IP address, the server actually uses a service address comprising a second IP address, wherein the first IP address is different from the second IP address, and the first IP address and the second IP address are in a same network segment;
   receiving a first packet from a client, wherein a target address of the first packet is the first IP address, and a destination port of the first packet is the first port;
   making a first modification to the first packet, wherein the first modification made to the first packet comprises changing the target address of the first packet from the first IP address to a preset third IP address, and changing a source address of the first packet from a fourth IP address to a preset fifth IP address;
   making a second modification to the first packet, wherein the second modification comprises changing the destination address of the first packet from the third IP address to the second IP address; and changing the source address of the first packet from the fifth IP address to a preset sixth IP address; and
   sending the first packet that has undergone the second modification to the server, such that the server receives the first packet originating from the client.

2. The method according to claim 1, wherein the third IP address is different from the first IP address, and the third IP address is different from the second IP address, the third IP address and the first IP address belong to different network segments, the third IP address and the second IP address belong to different network segments.

3. The method according to claim 2, wherein the sixth IP address and the fifth IP address belong to different network segments, the sixth IP address and the fourth IP address belong to a same network segment.

4. The method according to claim 3, wherein the first modification made to the first packet further comprises: changing the destination port of the first packet from the first port to the third port, wherein the server actually uses the second port serves the client;
   wherein the second modification made to the first packet further comprises: changing the destination port of the first packet from the third port to the second port, wherein the third port is different from the first port, and the third port is different from the second port.

5. The method according to claim 4, further comprising:
   generating a second packet in response to the first packet, wherein a source address of the second packet is the second IP address, and a destination address of the second packet is the sixth IP address;
   making a first modification to the second packet, wherein the first modification made to the second packet comprises: changing the source address of the second packet from the second IP address to the third IP address; and changing the destination address of the second packet from the six IP address to the fifth IP address;
   making a second modification to the second packet when the second packet has undergone the first modification, wherein the second modification made to the second packet comprises: changing the source address of the second packet from the third IP address to the first IP address; and changing the destination address of the second packet from the fifth IP address to the fourth IP address; and
   sending the second packet to the client according to the destination address of the second packet when the second packet has undergone the second modification, such that the client receiving the second packet originating from the server.

6. The method according to claim 5, wherein the first modification made to the second packet further comprises: changing the source port of the second packet from the second port to the third port;
   wherein the second modification made to the second packet further comprises: changing the source port of the second packet from the third port to the first port.

7. A network address translating system, comprising:
   at least one client, a first Nat device, a second Nat device, and a server;
   wherein the first Nat device defines a service address for a server, the defined service address comprises a first IP address, the server actually uses a service address comprising a second IP address, wherein the first IP address is different from the second IP address, and the first IP address and the second IP address are in a same network segment;
   wherein the first Nat device receives a first packet from a client, a target address of the first packet is the first IP address, and a destination port of the first packet is the first port;
   wherein the first Nat device makes a first modification to the first packet, the first modification made to the first packet comprises changing the target address of the first packet from the first IP address to a preset third IP address, and changing a source address of the first packet from a fourth IP address to a preset fifth IP address;
   wherein the second Nat device makes a second modification to the first packet, the second modification comprises changing the destination address of the first packet from the third IP address to the second IP address; and changing the source address of the first packet from the fifth IP address to a preset sixth IP address; and
wherein the second Nat device sends the first packet that has undergone the second modification to the server, such that the server receives the first packet originating from the client.

8. The network address translating system according to claim 7, wherein the third IP address is different from the first IP address, and the third IP address is different from the second IP address, the third IP address and the first IP address belong to different network segments, the third IP address and the second IP address belong to different network segments.

9. The network address translating according to claim 8, wherein the sixth IP address and the fifth IP address belong to different network segments, the sixth IP address and the fourth IP address belong to a same network segment.

10. The network address translating according to claim 9, wherein the first modification made to the first packet further comprises: changing the destination port of the first packet from the first port to the third port, wherein the server actually uses the second port serves the client;
wherein the second modification made to the first packet further comprises: changing the destination port of the first packet from the third port to the second port, wherein the third port is different from the first port, and the third port is different from the second port.

11. The network address translating according to claim 10, wherein the server generates a second packet in response to the first packet, a source address of the second packet is the second IP address, and a destination address of the second packet is the sixth IP address;
wherein the second Nat device makes a first modification to the second packet, the first modification made to the second packet comprises: changing the source address of the second packet from the second IP address to the third IP address; and changing the destination address of the second packet from the six IP address to the fifth IP address;
wherein the first Nat device makes a second modification to the second packet when the second packet has undergone the first modification, wherein the second modification made to the second packet comprises: changing the source address of the second packet from the third IP address to the first IP address; and changing the destination address of the second packet from the fifth IP address to the fourth IP address;
wherein the first Nat device sends the second packet to the client according to the destination address of the second packet when the second packet has undergone the second modification, such that the client receives the second packet originating from the server.

12. The network address translating according to claim 11, wherein the first modification made to the second packet further comprises: changing the source port of the second packet from the second port to the third port;
wherein the second modification made to the second packet further comprises: changing the source port of the second packet from the third port to the first port.

* * * * *